(12) United States Patent
Erad et al.

(10) Patent No.: US 11,164,550 B1
(45) Date of Patent: Nov. 2, 2021

(54) SYSTEM AND METHOD FOR CREATING AND OUTPUTTING MUSIC

(71) Applicant: HISEP TECHNOLOGY LTD., Yavne (IL)

(72) Inventors: Yariv Erad, Kidron (IL); Gad Vered, Be'er Ya'akov (IL); Uri Vered, Rishon Lezion (IL); Menachem Erad, Ashdod (IL)

(73) Assignee: HISEP TECHNOLOGY LTD., Yavne (IL)

( * ) Notice: Subject to any disclaimer, the term of this patent is extended or adjusted under 35 U.S.C. 154(b) by 0 days.

(21) Appl. No.: 17/237,260

(22) Filed: Apr. 22, 2021

Related U.S. Application Data

(60) Provisional application No. 63/014,143, filed on Apr. 23, 2020.

(51) Int. Cl.
*G10H 1/00* (2006.01)
*G10L 25/51* (2013.01)
*H04R 1/40* (2006.01)
*H04R 3/00* (2006.01)
*H04R 1/10* (2006.01)
*H04R 3/04* (2006.01)
*H04W 4/02* (2018.01)
(Continued)

(52) U.S. Cl.
CPC .............. *G10H 1/0025* (2013.01); *G01C 9/06* (2013.01); *G10L 25/51* (2013.01); *G10L 25/78* (2013.01); *H04R 1/1041* (2013.01); *H04R 1/406* (2013.01); *H04R 3/005* (2013.01); *H04R 3/04* (2013.01); *H04W 4/023* (2013.01); *G10H 2210/066* (2013.01); *G10H 2210/071* (2013.01); *G10H 2210/111* (2013.01); *G10H 2240/161* (2013.01); *H04R 2201/401* (2013.01); *H04R 2420/07* (2013.01); *H04R 2499/11* (2013.01)

(58) Field of Classification Search
CPC .... G10L 15/26; G10L 21/034; H04S 2400/11; H04S 2400/15; H04S 2420/01; H04S 7/303; H04S 2400/03; H04S 2400/13; H04S 7/302; H04S 7/305; H04S 7/307
USPC ..... 84/603, 1, 173, 290; 381/74, 71, 1–71.6, 381/94.1–94.5, 300, 119, 110, 303, 304; 700/94
See application file for complete search history.

(56) References Cited

U.S. PATENT DOCUMENTS

5,905,464 A * 5/1999 Lanciaux .................. G01S 3/14
                                                                    342/443
9,940,922 B1 * 4/2018 Schissler ................ G10K 15/08
(Continued)

*Primary Examiner* — Lun-See Lao
(74) *Attorney, Agent, or Firm* — AlphaPatent Associates, Ltd.; Daniel J. Swirsky (57) ABSTRACT

The subject matter discloses a system implemented on in a mobile electronic device, the system comprising a processing system of the device; and a memory that contains instructions comprising: detecting ambient sounds in the vicinity of the mobile electronic device; determining at least one property selected from a group consisting of a relative direction and relative distance of the ambient sounds relative to the mobile electronic device; analyzing the detected ambient sounds; outputting audio Interactive Music data based on the analysis of the ambient sounds and based on at least one of a relative direction and relative distance of the ambient sounds relative to the mobile electronic device; wherein said outputting is performed on the mobile electronic device.

21 Claims, 7 Drawing Sheets

(51) Int. Cl.
    *G01C 9/06*     (2006.01)
    *G10L 25/78*    (2013.01)

(56) References Cited

U.S. PATENT DOCUMENTS

| | | | |
|---|---|---|---|
| 2016/0150345 A1* | 5/2016 | Jang | H04S 7/302 |
| | | | 381/303 |
| 2016/0183024 A1* | 6/2016 | Karkkainen | H04S 7/303 |
| | | | 381/17 |
| 2019/0378430 A1* | 12/2019 | Kleiman Keinan | G09B 15/023 |
| 2020/0154229 A1* | 5/2020 | Habets | H04S 3/008 |
| 2021/0136510 A1* | 5/2021 | Tang | G06N 3/04 |

\* cited by examiner

SYSTEM AND METHOD FOR CREATING AND OUTPUTTING MUSIC

FIELD

The disclosure generally relates creating interactive music and outputting the interactive music.

BACKGROUND

Headphones in various form-factor are widely used, for example in the form of over-the-ear, earbuds, bone conductive, headphones, earphones. Headphones come in different shapes, sizes, colors and materials.

A key part of the competition between vendors in this market is on the quality of the sound in general, and when hearing music in particular. For that purpose, noise cancellation technologies in the earphones have a significant role, as they enable isolation of sounds from the nearby environment by various techniques and components. Such noise cancelation techniques include sensors that monitor such sounds, analyze them, and activate a counter sound wave in the same frequency to de-facto cancel the incoming disturbing sound.

In recent years noise cancellation technology has advanced to enable a scale or level of noise cancellation. Some headphone enables the user to control the level of noise cancellation so part of the ambient noise will still come through. This may be done to increase user safety when walking in a street—so he/she can partly hear the traffic around and be more aware of the environment.

Some other applications enable speech to enter the noise cancellation barrier, for the same goal—enabling users to enjoy noise cancellation while not being totally sound-disconnected from their environment. For that matter, headphones are equipped with microphones and sound sensors. However, the ambient sound around the user is not being used in any manner. It is regarded as an interference which needs to be overcome.

SUMMARY

The subject matter discloses the use of directional ambient sound sensors in headphones and/or speakers to enable methods to create interactive music, by detecting ambient sounds, determining the relative direction and/or distance of these ambient sounds relative to the headphone device, and creating interactive music. The interactive music may be created after analyzing the ambient sounds The subject matter also discloses the use of sound analysis algorithms in such manner that the detected ambient sound can be filtered to types, can be analyzed to determine parameters such as (but not limited to) rhythms, rate, bit, tone, pitch, repetitiveness, etc., and based on said analysis to create interactive music that correlate to the ambient sounds and their direction and/or distance. The subject matter also discloses creation of the interactive music in real-time or near real-time, on site, responding to changes in the collected ambient sounds.

The subject matter discloses a system implemented in a mobile electronic device, the system comprising: a processing system of the device comprising one or more processors; and a memory system comprising one or more computer-readable media, wherein the one or more computer-readable media contain instructions that, when executed by the processing system, cause the processing system to perform operations comprising: detecting ambient sounds in the vicinity of the mobile electronic device; determining at least one property selected from a group consisting of a relative direction and relative distance of the ambient sounds relative to the mobile electronic device; analyzing the detected ambient sounds; outputting audio Interactive Music data based on the analysis of the ambient sounds and based on at least one of a relative direction and relative distance of the ambient sounds relative to the mobile electronic device; wherein said outputting is performed on the mobile electronic device.

In some cases, the system further comprising filtering a portion of the ambient sounds based on at least one predefined rule. In some cases, the audio Interactive Music data is correlated with the ambient sounds and at least one of the relative direction and relative distance of the ambient sounds relative to the mobile electronic device.

In some cases, the system further comprising updating the audio Interactive Music data based on changes in the detected ambient sounds. In some cases, analyzing the ambient sounds comprising measuring a property of the ambient sounds. In some cases, the property of the ambient sounds is selected from a group comprising rhythms, rate, bit, tone, pitch, repetitiveness, volume, interaction with other sounds and movement of sound source.

In some cases, creating the audio Interactive Music data is performed based on the measured property extracted from the ambient sounds. In some cases, the process of analyzing the ambient sounds comprising identifying a person's voice in the ambient sounds and removing the person's speech from the ambient sounds. In some cases, the creating the audio Interactive Music data is performed based on preferences inputted by a user of the mobile electronic device into the memory system.

In some cases, the system further comprising multiple audio sensors mounted on and/or in the mobile electronic device, said multiple audio sensors collect audio sensors in a 360 degrees horizontal plane around the mobile electronic device. In some cases, the system further comprising a wireless transceiver for exchanging wireless communication with another device. In some cases, the system further comprising a tilt sensor coupled to the mobile electronic device for measuring or maintaining orientation of the mobile electronic device.

In some cases, the determining at least one of a relative direction and relative distance of the ambient sounds relative to the mobile electronic device is performed based on information collected by the tilt sensor. In some cases, determining the at least one of a relative direction and relative distance of the ambient sounds relative to the mobile electronic device is performed using a process stored in the memory. In some cases, the system further comprising an input unit in communication with the processing system for receiving an input from a user of the system.

In some cases, the system further comprising a second mobile electronic device communicating with the mobile electronic device over a wireless medium, wherein the mobile electronic device and the second mobile electronic device cooperate to compute a relative direction of the ambient sounds relative to the mobile electronic device and to the second mobile electronic device. In some cases, the processing system is further configured for creating the audio Interactive Music data on the mobile electronic device.

In some cases, the audio Interactive Music data is created in a remote device communicating with the mobile electronic device. In some cases, the audio Interactive Music data comprises sound signals extracted from the ambient sound. In some cases, the memory stores multiple pre-selected audio files, and the mobile electronic device output combines at least one of the pre-selected audio files based with on the collected ambient sound to create the audio Interactive Music data. In some cases, the system further comprising a speaker for outputting the audio Interactive Music data. In some cases, the system is integrated in a speaker device.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

For the purposes of this paper, and in order to enable clear understanding of the invention described herewith, the definitions and terms used in this paper shall have the meaning set forth beside them as well as the broadest meaning resulting from their context. However, it should be clearly understood, that the use of such meanings shall in no way serve to limit the scope of possible interpretation of the ideas, and the ideas and concepts provided herewith shall apply even if other terms and definitions are used.

The examples provided in this paper relate to the use of the invention for various applications. However, it is clearly stated that the use of the invention can apply to other types of applications and devices (such as Headphones, Speakers, smart phones), and for any device or application. In these cases, the features of the inventions described hereunder shall apply as well.

The terms "headphones" or "earphones" may be defined as a mobile electronic device with a part to cover and/or enter an ear in whole or in part, through which a person can perform at least one of listening to music, conducting phone conversations, and hear any type of audio content—with or without other people hearing it as well, and with or without noise cancellation means. For that matter, any type of such device—including (but not limited to) for example earbuds, in-ear, over the ear, bone conductive, headphones capable to operate as speakers, etc.—shall be included in the definition of headphones.

The term "ambient sound" may be defined as the background noise present at a given scene or location. This can include naturally-made noises such as nature elements, vegetation, animals, humans, voices, etc., as well as artificially/mechanically-made sounds—such as traffic, transportation, machinery, objects, music and the like.

The term "speaker" may be defined as a device that changes electrical signals into sounds loud enough to be heard at a distance.

The term "interactive music" or "audio interactive music data" may be defined as the music generated from the ambient sounds and the headphones generated outcome based on the analysis and creation of such ambient sounds.

Figure 1:
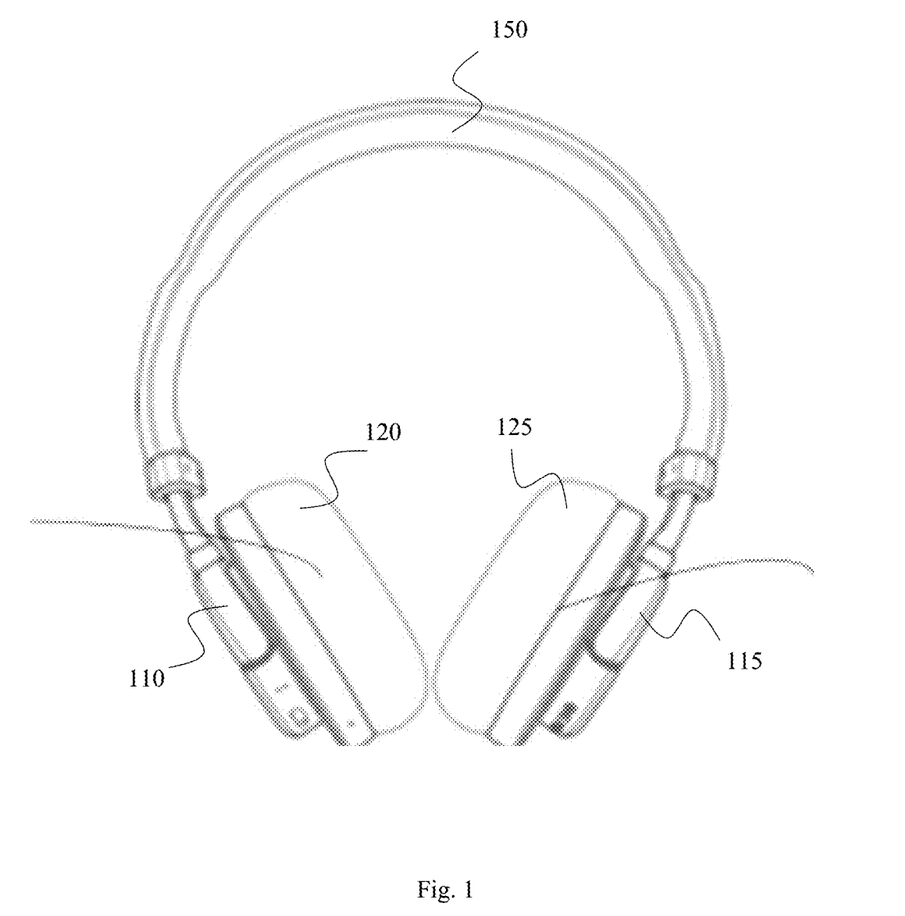
FIG. 1 schematically shows a headphone system, according to exemplary embodiments of the invention.

FIG. 1 schematically shows a headphone system, according to exemplary embodiments of the invention. The headphone comprises two loudspeakers 120, 125 and a body securing the loudspeakers 120, 125 to the user's head or ears. The body may comprise two holders 110, 115, secured to one of the loudspeakers 120, 125, respectively. The two holders 110, 115 may be coupled to each other, for example using an arc 150. In some other cases, the holders 110, 115 are separate, each receiving signals from a controller (not shown). The loudspeakers 120, 125 may comprise a transducer for converting electrical signals to sound. The system also comprises electrical circuitry as disclosed in FIG. 5.

Figure 2:
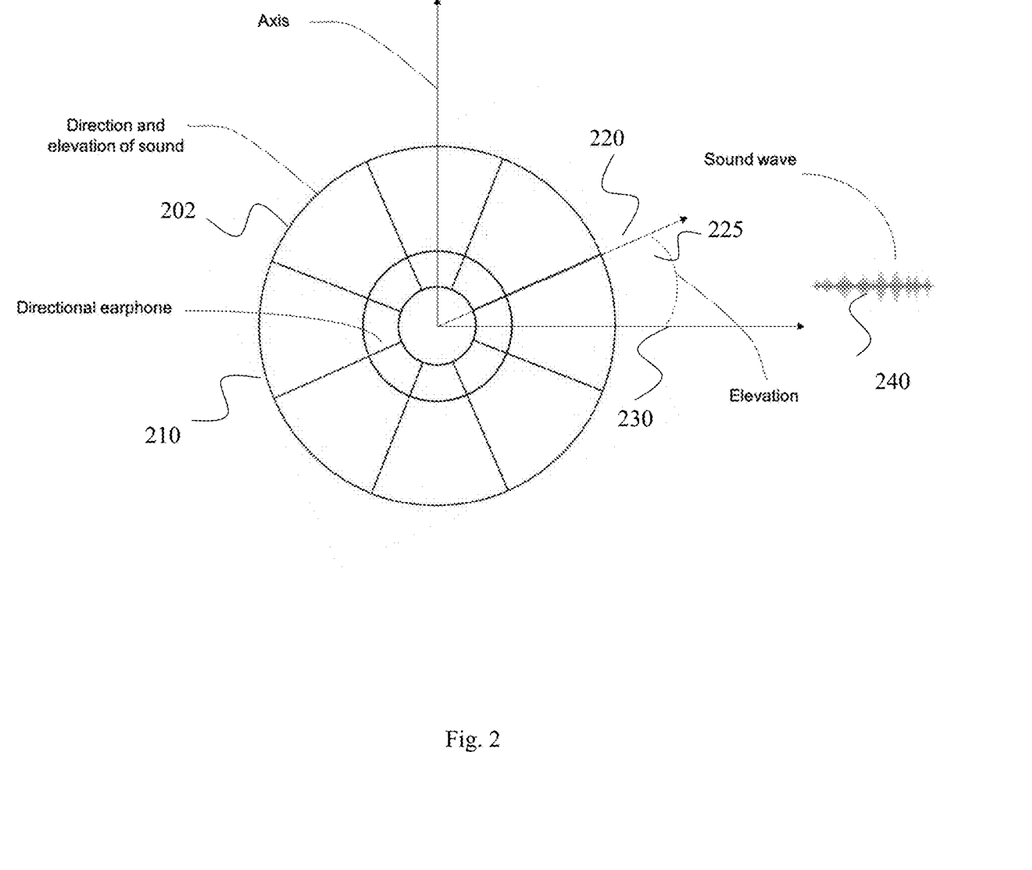
FIG. 2 schematically shows direction finding relative to the headphone system, according to exemplary embodiments of the invention.

FIG. 2 schematically shows direction finding relative to the mobile electronic device, according to exemplary embodiments of the invention. The direction finding unit of the system may be integrated in the mobile electronic device that comprises a speaker or coupled to headphones. The direction of the ambient sounds may be defined by an azimuth or by a combination of elevation and azimuth. For example, ambient sound 240 is detected to be provided from an azimuth represented by imaginary lines 220 and 230, forming direction 225. In some exemplary cases, the direction finding outputs a range of azimuths and/or azimuth and elevation. For example, defining that the ambient sound is in azimuth range of 125-145 and elevation of 12-16 degrees. In some exemplary cases, the direction finding unit may determine the relative direction of multiple ambient sounds concurrently. In some exemplary cases, the direction finding unit may determine the distance of only a portion of the ambient sounds collected by the audio sensors of the system.

Figure 3A:
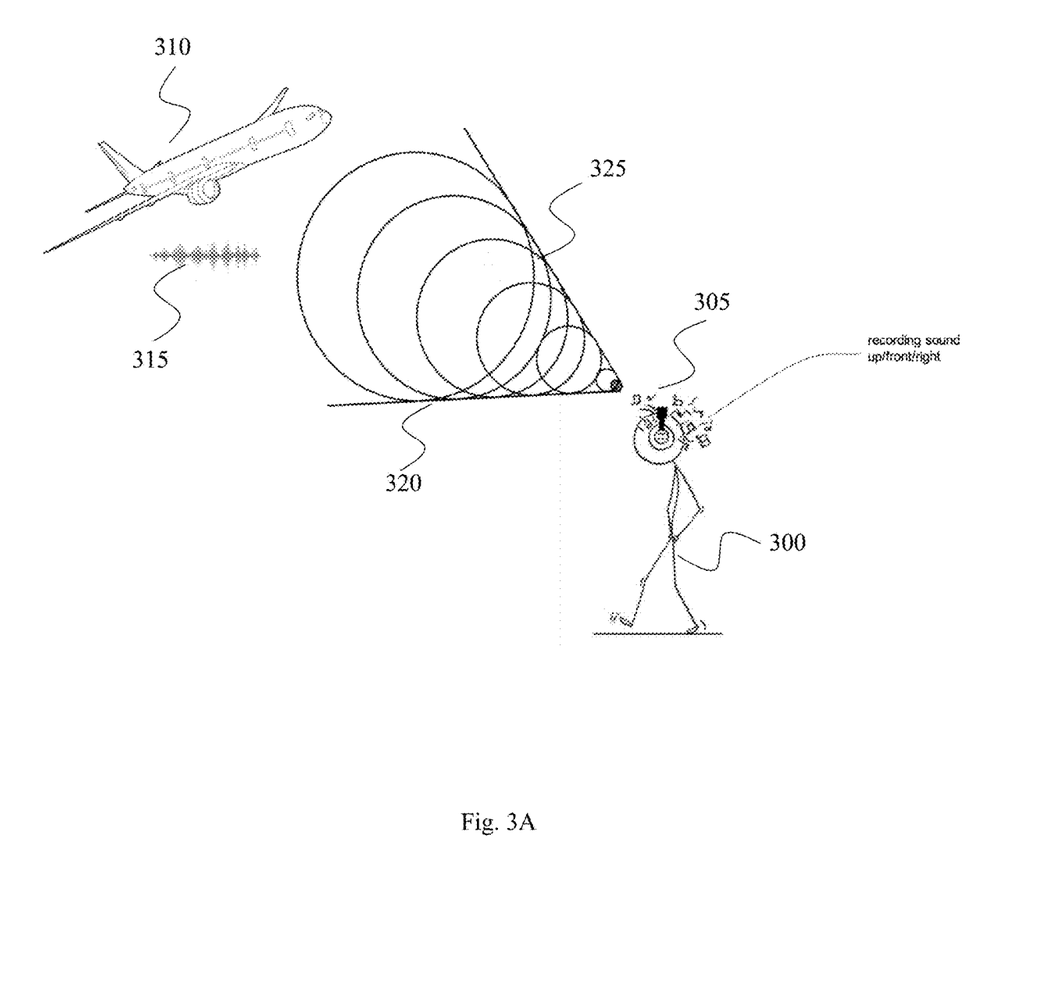
FIGS. 3A-3C schematically show ambient sounds and their relative direction relative to the headphone system, according to exemplary embodiments of the invention FIG. 4 schematically shows a method for creating music in a headphone system, according to exemplary embodiments of the invention.
Figure 3B:
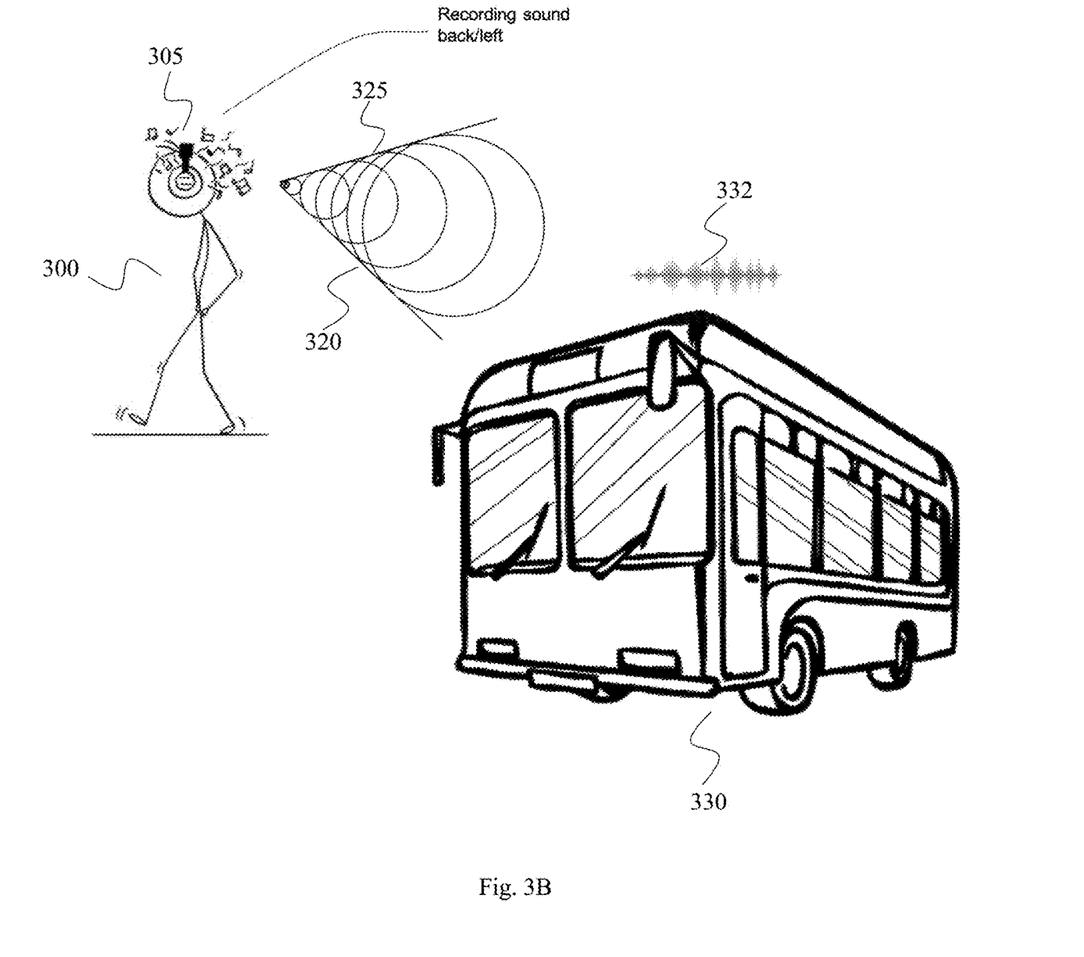
Figure 3C:
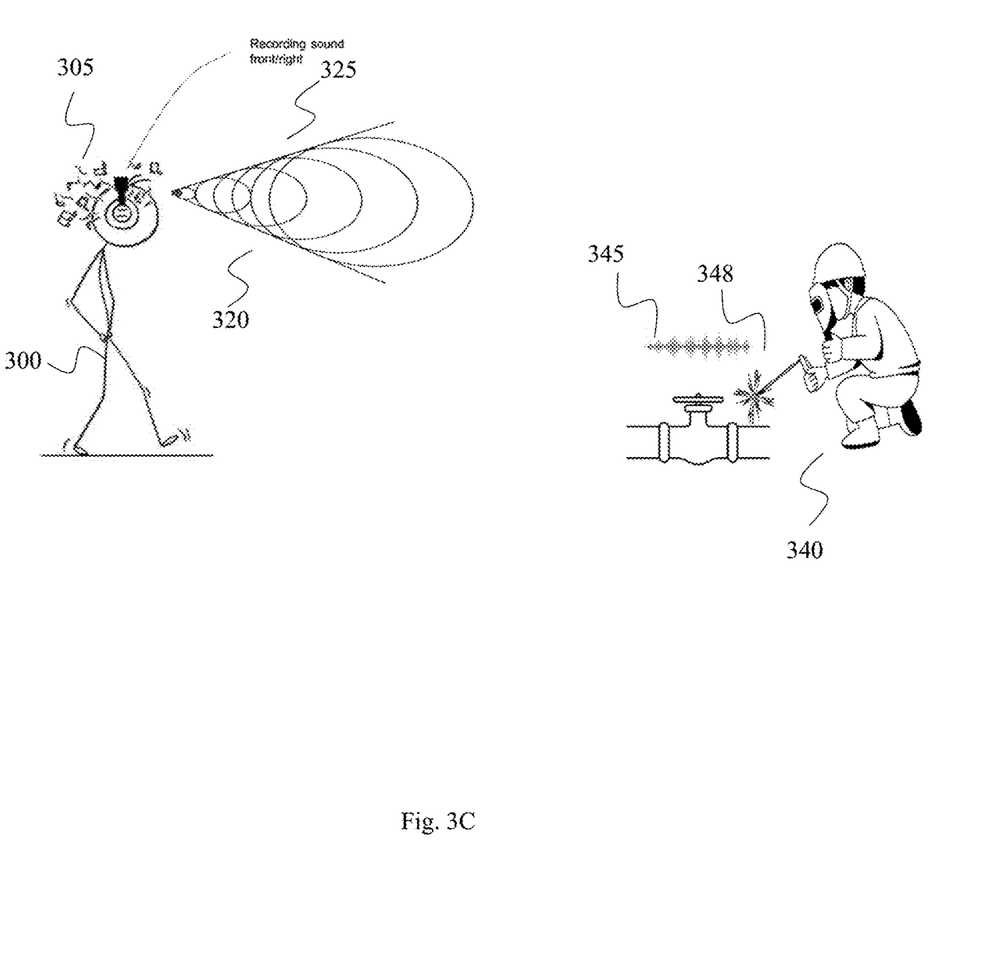

FIGS. 3A-3C schematically show ambient sounds and their relative direction relative to the system, according to exemplary embodiments of the invention. In FIG. 3A, the headphone system 305 held by a person 300 detects ambient sound 315 created by movement of airplane 310. The direction finding unit computes the relative direction or relative location of the ambient sound 315 to be between imaginary lines 320 and 325. The imaginary lines 320 and 325 define the altitude and/or azimuth of the ambient sound 315 relative to the audio sensors of the headphone system 305.

In FIG. 3B, the headphone system 305 held by a person 300 detects ambient sound 332 created by movement of bus 330 or operation of the bus's engine. The imaginary lines 320 and 325 define the altitude and/or azimuth of the ambient sound 332 relative to the audio sensors of the headphone system 305. The system may include speakers instead of headphones, for example when integrated with, or embedded in, a mobile electronic device, such as a cellular phone, tablet, laptop and the like.

In FIG. 3C, the headphone system 305 held by a person 300 detects ambient sound 345 created by worker 340 operating tool 348. The imaginary lines 320 and 325 define the altitude and/or azimuth of the ambient sound 345 relative to the audio sensors of the headphone system 305.

Figure 4:
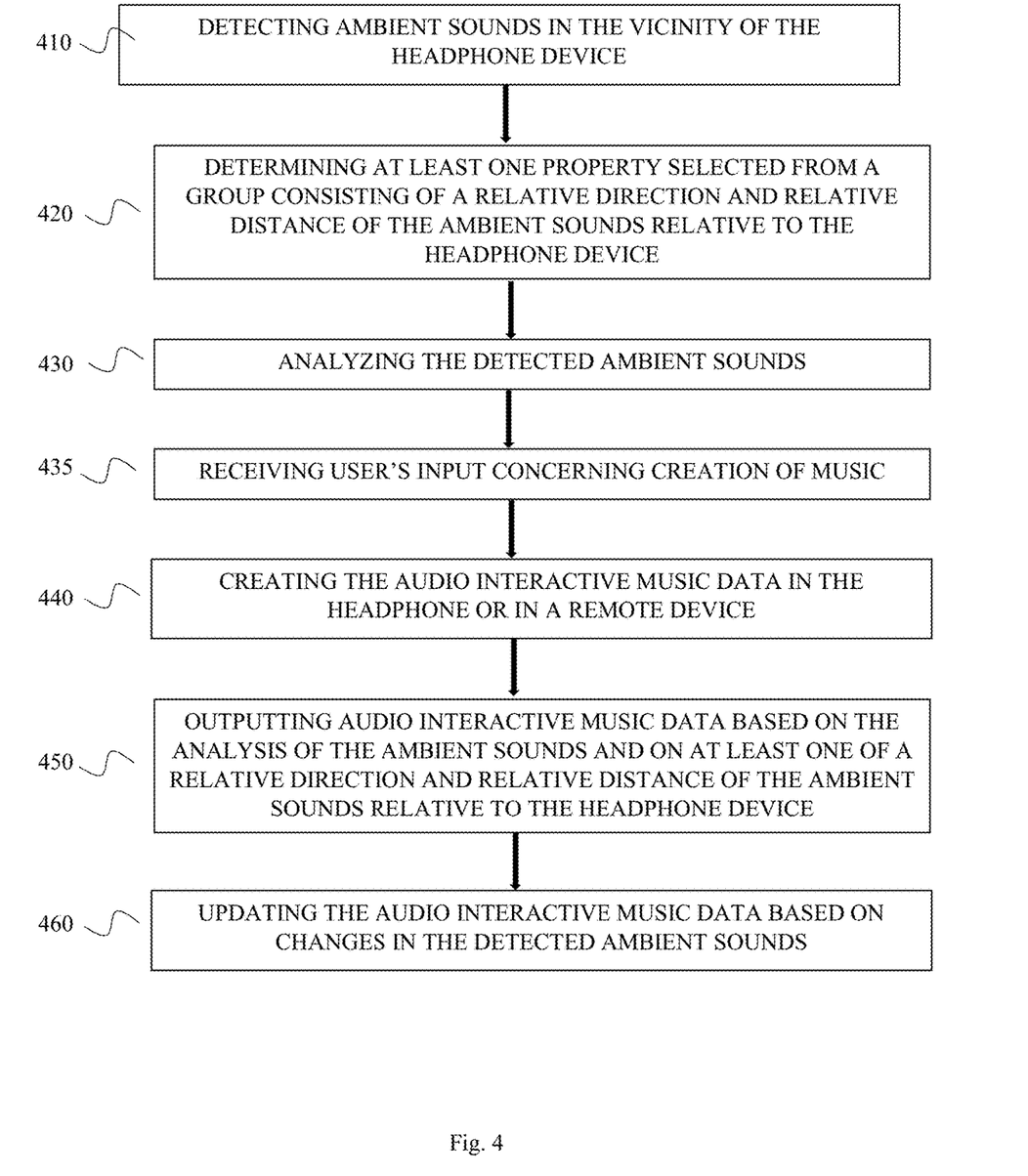

FIG. 4 schematically shows a method for creating music in a mobile electronic device, according to exemplary embodiments of the invention.

Step 410 discloses detecting ambient sounds in the vicinity of the mobile electronic device. The detection may be performed using audio sensors, such as microphones. In some cases, the detection may be performed by sampling the audio in the vicinity of the mobile electronic device.

Step 420 discloses determining at least one property selected from a group consisting of a relative direction and relative distance of the ambient sounds relative to the mobile electronic device. Such determination may be performed using a direction finding technique, for example based on measurements of signals received at the sensors, such as audio signals, RF signals, light signals, and the like.

determining the relative direction and/or relative distance of the ambient sounds relative to the mobile electronic device may include any type and/or technique and/or hardware or circuitry and/or software architecture and/or algorithms applicable to ambient sound direction-finding (DF). The type and technique to determine said ambient sounds relative distance may include any type and/or technique and/or hardware or circuitry and/or software and/or algorithms applicable to ambient sound distance measurement.

Step 430 discloses analyzing the detected ambient sounds. The analysis may comprise extracting a property from the ambient sounds. The analysis may comprise identifying an object that created the ambient sounds.

Step 435 discloses receiving user's input concerning creation of interactive music. The input may be provided by the user pressing a button, touch-operated screen, keys, a mouse, or a remote device communicating with the mobile electronic device, such as the user's cellular phone or tablet. In some cases, the user may input commands or information into the input unit, and the interactive music data is created based on such commands or information. For example, the user may wish to generate quiet piano-based interactive music. The mobile electronic device may use the user's selection to gather and then analyze the ambient sounds, filter-out sounds that are not applicable, and use the remaining ambient sounds to generate interactive music, for example by adding to them or super-imposing on them piano playing sounds.

Step 440 discloses creating the audio Interactive Music data in the mobile electronic device or in a remote device. The interactive music data can be created in an online platform such as a cloud-based service. in such a case, the collected ambient sounds or properties extracted from the sounds are uploaded to such online platform. The interactive music data may then be downloaded back to the mobile electronic device. The online platform may also analyze the ambient sounds, or such analysis is performed in the mobile electronic device. The interactive music data can be created in the mobile electronic device. The interactive music data may be stored in the memory of the mobile electronic device. The interactive music data may be uploaded to a web cloud storage. The interactive music data may be associated with a time stamp and/or location data. The time stamp and/or location data may also be uploaded to the web cloud storage. In some cases, other users may download the interactive music data given permissions by the user or owner of the mobile electronic device of the subject matter. The permissions to download the interactive music data may be restricted to users at a specific location—i.e., only users at the same location can download interactive music made by another user at this location.

The interactive music data may be a combination of a known musical piece, such as a known song, combined with musical data created based on the analysis of the ambient sounds. The level of combination, for example which musical piece is more significant in the interactive music data, may be determined by the user of the mobile electronic device. The interactive music data may include sounds gathered from the ambient sound. For example, said interactive music data may integrate sounds of a coffee machine, water fountain, jumping balls, etc. in the generated interactive music.

Step 450 discloses outputting audio Interactive Music data based on the analysis of the ambient sounds and on at least one of a relative direction and relative distance of the ambient sounds relative to the mobile electronic device.

Step 460 discloses updating the audio Interactive Music data based on changes in the detected ambient sounds. For example, a user may be located in a busy train station, wherein the ambient sounds change when trains come and go, people walk near the user, and the like.

The ambient sounds may change as the user walks around, rotate, change his relative direction vs each such ambient sound, and/or his relative distance. The change in the relative direction or relative distance may change properties of the detected ambient sounds, such as rhythms, tunes, patterns, scales frequencies and the like. In such cases, the mobile electronic device may generate interactive, dynamic ever-changing music from such ambient sounds.

Figure 5:
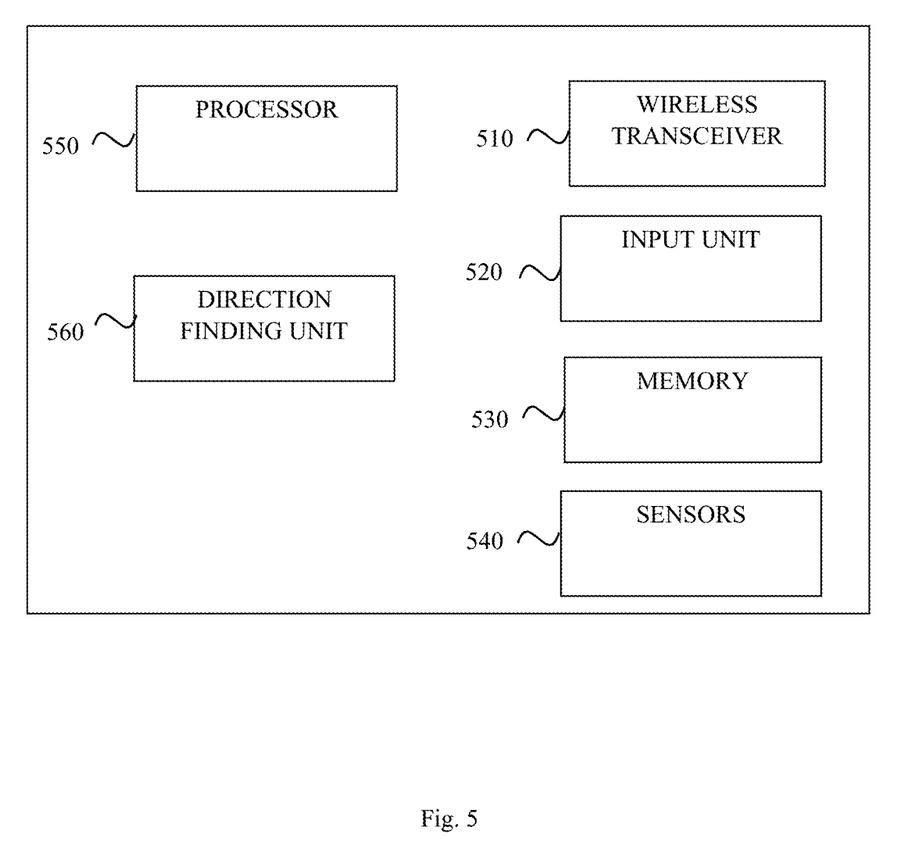
FIG. 5 schematically shows the computerized components of the headphone system, according to exemplary embodiments of the invention.

FIG. 5 schematically shows the computerized components of the system, according to exemplary embodiments of the invention.

The system comprises a wireless transceiver 510 for exchanging wireless communication with another electronic device, exchanging comprises at least one of sending and receiving signals. The wireless transceiver 510 wireless may enable a mobile electronic device to wirelessly communicate with other mobile electronic devices in its wireless communication range—either directly or via other such mobile electronic devices acting as relays.

The wireless transceiver 510 enables the system to transfer information and/or data and/or packets (formatted blocks of data) and/or communication, acknowledgment/no-acknowledgment and/or voice over long or short distances without the use of electrical conductors or "wires". The wireless transceiver 510 may use Radio waves and/or light waves and/or sound waves, at any given frequency—such as, but not limited to -5 Khz-600 Ghz.

The wireless transceiver 510 may use any protocol or standard in any given frequency that can be used to conduct Radio and/or light and/or sound Wireless Communication, such as, but not limited to, wireless Information Technology, cellular communication (such as, but not limited to, GSM, GPRS, CDMA), Wireless Networks, WLAN computer communications, wireless networking standards (such as IEEE 802.11), wireless personal area networks (WPAN) and wireless mesh networks, and "Internet-of-Things". (It should be clearly stated that among such protocols, but not limited only to them, are Wi-Fi, Bluetooth, Low-Energy-Bluetooth (BLE), UWB, Wi-Max, ZigBee, Z-wave, Insteon, Cellular devices communication protocols, Near-field Communication (NFC), RFID protocols or standards). Shall also refer to the use of such protocols over any radio frequency, such as—but not limited to, UHF, HF, VHF, 5 Khz-600 Ghz.

The system may also comprise an input unit 520 for receiving information or commands from the user of the system. The input unit 520 may enablee the user to set a scale of deviation from the ambient sounds for the interactive music data generation process. For example, the user may select that the generated interactive music data to be as close as possible in most parameters to the parameters of the ambient sounds or select to deviate significantly from the ambient sounds. The mobile electronic device may enable the user to play, and/or play automatically, "regular" music and/or songs, that correlates with the ambient sound.

The input unit 520 may enable the user to configure the level of integration, instruments and/or digital electronic sounds. For example, the user may select to generate the interactive music only from the gathered ambient sound on one side of the scale, or generate interactive music from a database of musical instruments sounds and melodies, using the ambient sound data as the reference. The scale may be applied via the web could tools, if the interactive music is created there and not in the mobile electronic device.

The system may also comprise a memory 530 for storing information. The memory 530 may store a set of instructions for performing the methods disclosed herein. The memory 530 may also store preferences inputted by the user, prior interactive music created and/or outputted by the headphone or speaker of the mobile electronic device and the like.

The system comprises one or more sensors 540. The sensors 540 comprise an audio sensor for collecting audio signals in the vicinity of the system. The audio signals may be ambient noise, or music outputted from a speaker that is not part of the mobile electronic device. The system may comprise multiple audio sensors. The audio sensor may be a microphone. The multiple audio sensors may be placed in the mobile electronic devices in such manner to provide 360 degrees capability to conduct ambient sound direction finding. The multiple audio sensors may be placed in the mobile electronic devices in such manner to ensure optimal 360 degrees gathering or collection of ambient sound. In some cases, the audio sensor may lack a physical ability to collect human speech, to maintain people's privacy.

In some cases, the system may comprise motion sensors for collecting information concerning motion of the system. For example, the system may comprise at least one tilt sensors or combination of such sensors. The system may comprise an accelerometer that may be used to measure proper acceleration—i.e., the acceleration experienced relative to freefall. The accelerometer may measure single and/or multi-axis models available to detect magnitude and direction of the acceleration as a vector quantity. The sensor can be used to sense position, vibration and shock. The motion sensor may be a gyroscope for measuring or maintaining orientation, based on the principles of conservation of angular momentum. The motion sensor may be a tilt sensor may mean device and/or component that can measure the tilting in often two axes of a reference plane in two axes. The motion sensor may be used to assist the mobile electronic device is determining the relative direction and/or relative distance vs ambient sounds and/or vs other such mobile electronic devices.

The system may also comprise a compass. The compass may be used to determine the mobile electronic device's orientation, thus being used as part of the filtration process. For example, the processor may use data collected by the compass to determine which ambient sounds to filter and which ambient sounds to use when creating the interactive music data.

The system comprises a processor 550 that manages the operation of the mobile electronic device. The processor may include one or more processors, microprocessors, and any other processing device. The processor 550 is coupled to the sensors 540 for collecting the ambient noises. The processor 550 is coupled to the memory 530 for executing a set of instructions stored in the memory 530. The processor 550 may create the interactive music, or send a command to a remote device, such as a cloud service or a cellular phone communicating with the mobile electronic device, in case the remote device is configured to create the music.

The processor 550 may enable creating dynamic, ever-changing interactive music that correlates and adapt to the changes in the ambient sounds. For example, a user may start generating interactive music data while in vicinity to a train, and as such the sounds made by the trains may be the dominate ambient sounds gathered. However, the user may move away from the train into the station, the train ambient sound may diminish gradually, while ambient sounds of shops, speakers, crowds, escalators, background music, and such may become more dominant in volume, changing the rhythms, bit, sound frequency etc.—resulting in changing the generated interactive music based on these changes.

The processor 550 may analyze said ambient sounds. the analysis may include any type and/or technique and/or hardware, or electrical circuitry and/or software and/or algorithms applicable to analyze the ambient sounds. The analysis may include extracting or measuring parameters—such as (but not limited to) rhythms, rate, bit, tone, pitch, repetitiveness, volume, interaction with other sounds, movement of sound source and the like. The analysis of the ambient sounds may include filter the ambient sounds' parameters—such as (but not limited to) analyzing speech, analysis and identifying people's voices—for purposes such as privacy security of people around.

The analysis of the ambient sounds may comprise generating create at least one pattern that can be used to create the interactive music data. The user may select to control priorities for such generated interactive music, based on the gathered ambient sounds parameters or on any type of preference, such as (but not limited to) mood, music type, musical tools and the like.

The system comprises a Direction Finding (DF) unit 560 for finding the relative direction and/or the relative distance of the ambient noise from the sensors 540 of the system. The DF unit 560 may be RF-Based (radio). The DF unit 560 may be audio/sound-based. The DF unit 560 may be light-based. The DF unit 560 may be used to determine the relative direction between the system to other systems and/or ambient sound. The DF unit 560 may include at least one antenna used for the DF. The DF unit 560 may be located in different parts or sides of the system. The DF unit 560 of the system may include RF absorbing materials as part of the DF unit 560. The DF unit 560 may be UWB-based DF techniques and/or methods. The DF unit 560 may apply at least one DF mean or combination of DF means.

The system may also comprise a noise cancelation module 570. The noise cancelation module 570 may be of different types, to filter different kind of sounds. The noise cancelation module 570 may be used to filter desired and/or specific ambient sounds and/or ambient sound types and/or ambient sounds rhythms—either filtering-out or filtering-in. For example, a user may wish to create interactive jazz music from the ambient sound around him. After selecting the genre, the system may apply the noise cancellation means to filter-out ambient sounds which are not suitable for the creating of jazz interactive music from the ambient sounds.

The system may also comprise a user interface for providing information to the user. The user interface may comprise a display or a speaker. The user interface may be used by the device to display and/or provide information to the user or receive information from the user.

The system may also comprise at least one camera for capturing images. The system may also comprise a location determination unit such as (but not limited to) GPS, Cellular, Wi-Fi, BT, UWB, and any other applicable technology and technique to enable location determination indoors and/or outdoors.

The system may perform a method to use the system's camera to create interactive music. Such method comprises identifying the user's gestures, such as hand's gestures, using the camera and converting the identified gestures into pre-defined commands—such as, but not limited to—pointing in a direction, changing music pace or rhythm, pointing at a source of a specific ambient sound to make it a priority in the music creating process. The system may include at least 2 such mobile electronic devices, that may communicate wirelessly directly with one another. The multiple mobile electronic devices may determine their relative position (relative direction, distance, orientation, altitude) relative to each other. The multiple mobile electronic devices may share the detected ambient sounds with each other. The multiple mobile electronic devices may share relative position of the ambient sounds, so said ambient sounds gathered in mobile electronic device A', may be oriented to their relative position vs mobile electronic device B'.

While the disclosure has been described with reference to exemplary embodiments, it will be understood by those skilled in the art that various changes may be made, and equivalents may be substituted, for elements thereof without departing from the scope of the invention. In addition, many modifications may be made to adapt a particular situation or material to the teachings without departing from the essential scope thereof. Therefore, it is intended that the disclosed subject matter not limit the invention to any particular embodiment thereof

What is claimed is:

1. A system implemented on in a mobile electronic device, the system comprising:
   a processing system of the device comprising one or more processors; and
   a memory system comprising one or more computer-readable media, wherein the one or more computer-readable media contain instructions that, when executed by the processing system, cause the processing system to perform operations comprising:
   detecting ambient sounds in the vicinity of the mobile electronic device;
   determining at least one property selected from a group consisting of a relative direction and relative distance of the ambient sounds relative to the mobile electronic device;
   analyzing the detected ambient sounds;
   outputting audio Interactive Music data based on the analysis of the ambient sounds and based on at least one of a relative direction and relative distance of the ambient sounds relative to the mobile electronic device;
   wherein said outputting is performed on the mobile electronic device.

2. The system of claim 1, further comprising filtering a portion of the ambient sounds based on at least one predefined rule.

3. The system of claim 1, wherein the audio Interactive Music data is correlated with the ambient sounds and at least one of the relative direction and relative distance of the ambient sounds relative to the mobile electronic device.

4. The system of claim 1, further comprising updating the audio Interactive Music data based on changes in the detected ambient sounds.

5. The system of claim 1, wherein the analyzing the ambient sounds comprising measuring a property of the ambient sounds.

6. The system of claim 5, wherein the property of the ambient sounds is selected from a group comprising rhythms, rate, bit, tone, pitch, repetitiveness, volume, interaction with other sounds and movement of sound source.

7. The system of claim 1, wherein creating the audio Interactive Music data is performed based on the measured property extracted from the ambient sounds.

8. The system of claim 1, wherein analyzing the ambient sounds comprising:
   identifying a person's voice in the ambient sounds;
   removing the person's speech from the ambient sounds.

9. The system of claim 1, wherein creating the audio Interactive Music data is performed based on preferences inputted by a user of the mobile electronic device into the memory system.

10. The system of claim 1, further comprising multiple audio sensors mounted on the mobile electronic device, said multiple audio sensors collect audio sensors in a 360 degrees horizontal plane around the mobile electronic device.

11. The system of claim 1, further comprising a wireless transceiver for exchanging wireless communication with another device.

12. The system of claim 1, further comprising a tilt sensor coupled to the mobile electronic device for measuring or maintaining orientation of the mobile electronic device.

13. The system of claim 12, wherein determining at least one of a relative direction and relative distance of the ambient sounds relative to the mobile electronic device is performed based on information collected by the tilt sensor.

14. The system of claim 1, wherein determining the at least one of a relative direction and relative distance of the ambient sounds relative to the mobile electronic device is performed using a process stored in the memory.

15. The system of claim 1, further comprising an input unit in communication with the processing system for receiving an input from a user of the system.

16. The system of claim 1, further comprising a second mobile electronic device communicating with the mobile electronic device over a wireless medium, wherein the mobile electronic device and the second mobile electronic device cooperate to compute a relative direction of the ambient sounds relative to the mobile electronic device and to the second mobile electronic device.

17. The system of claim 1, wherein the processing system is further configured for creating the audio Interactive Music data on the mobile electronic device.

18. The system of claim 1, wherein the audio Interactive Music data is created in a remote device communicating with the mobile electronic device.

19. The system of claim 1, wherein the audio Interactive Music data comprises sound signals extracted from the ambient sound.

20. The system of claim 1, wherein the memory stores multiple pre-selected audio files, and the mobile electronic device outputs combine at least one of the pre-selected audio files based with on the collected ambient sound to create the audio Interactive Music data.

21. The system of claim 1, wherein integrated in a speaker device.

\* \* \* \* \*